United States Patent
Ogawa et al.

(10) Patent No.: US 6,860,349 B2
(45) Date of Patent: Mar. 1, 2005

(54) COOLING SYSTEM FOR FUEL CELL POWERED VEHICLE AND FUEL CELL POWERED VEHICLE EMPLOYING THE SAME

(75) Inventors: Takayuki Ogawa, Saitama (JP); Mitsuharu Imaseki, Saitama (JP); Takeshi Ushio, Saitama (JP); Katsumi Saitou, Saitama (JP); Mamoru Yoshikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 177 days.

(21) Appl. No.: 09/855,661

(22) Filed: May 16, 2001

(65) Prior Publication Data

US 2001/0050191 A1 Dec. 13, 2001

(30) Foreign Application Priority Data

May 26, 2000 (JP) ...................................... 2000-155619
May 26, 2000 (JP) ...................................... 2000-155620

(51) Int. Cl.⁷ .............................................. B60K 1/00
(52) U.S. Cl. ...................... 180/65.2; 180/65.3; 165/41; 417/350; 429/26
(58) Field of Search ............................... 180/65.1, 65.2, 180/65.3, 68.1, 54.1, 68.4, 68.6; 429/24, 26; 165/41–43, 120, 164, 244–246; 62/239, 243, 244; 417/350, 429

(56) References Cited

U.S. PATENT DOCUMENTS

| | | | | |
|---|---|---|---|---|
| 4,229,142 A | * | 10/1980 | Le Dall et al. ............... | 165/41 |
| 4,395,130 A | * | 7/1983 | Kutowy ....................... | 366/137 |
| 4,558,992 A | * | 12/1985 | Hamano et al. ............ | 180/65.1 |
| 4,678,723 A | * | 7/1987 | Wertheim .................... | 429/17 |
| 5,482,441 A | * | 1/1996 | Permar ....................... | 417/216 |
| 5,605,770 A | | 2/1997 | Andreoli et al. | |
| 5,785,504 A | * | 7/1998 | Cote .......................... | 417/313 |
| 5,871,041 A | * | 2/1999 | Rafalovich et al. .......... | 165/10 |
| 5,950,752 A | * | 9/1999 | Lyons ......................... | 165/41 |
| 6,124,644 A | * | 9/2000 | Olson et al. ................ | 180/165 |
| 6,171,718 B1 | * | 1/2001 | Murach et al. .............. | 425/25 |
| 6,213,233 B1 | * | 4/2001 | Sonntag et al. ....... | 123/142.5 R |
| 6,223,844 B1 | * | 5/2001 | Greenhill et al. .......... | 180/65.1 |
| 6,269,872 B1 | * | 8/2001 | Anderson ................... | 165/244 |
| 6,312,842 B1 | * | 11/2001 | Reiser et al. ................ | 429/13 |
| 6,394,207 B1 | * | 5/2002 | Skala ......................... | 180/65.1 |
| 6,394,210 B2 | * | 5/2002 | Matsuda et al. ............ | 180/65.1 |
| 6,448,535 B1 | * | 9/2002 | Ap .............................. | 165/41 |
| 6,454,543 B1 | * | 9/2002 | Beck et al. ............... | 417/199.1 |

FOREIGN PATENT DOCUMENTS

| JP | 11-178116 | 7/1999 |
|---|---|---|
| JP | 2000323146 A | 11/2000 |

* cited by examiner

*Primary Examiner*—Lesley D. Morris
*Assistant Examiner*—L. Lum
(74) *Attorney, Agent, or Firm*—Arent Fox, PLLC (57) ABSTRACT

A cooling system for a fuel cell and a fuel cell powered vehicle are disclosed. The cooling system and the fuel cell powered vehicle have a primary circulation passage adapted to circulate primary coolant for cooling the fuel cell, and a secondary circulation passage adapted to circulate secondary coolant for cooling a heat generating source including at least an electric vehicle motor. The primary coolant and the secondary coolant are driven by primary and secondary circulation pumps that are circulated by a single common drive motor, with the primary coolant being cooled with the secondary coolant in a common heat exchanger.

13 Claims, 4 Drawing Sheets

COOLING SYSTEM FOR FUEL CELL POWERED VEHICLE AND FUEL CELL POWERED VEHICLE EMPLOYING THE SAME

FIELD OF THE INVENTION

The present invention relates to fuel cell powered vehicles each equipped with a fuel cell as a power source for propelling an electric vehicle motor and, more particularly, to a cooling system for efficiently cooling the fuel cell, a cooling system for cooling the fuel cell and a heat generating source composed of the electric vehicle motor and a fuel cell powered vehicle which employs the cooling system for cooling the fuel system.

BACKGROUND OF THE INVENTION

In recent years, considerable research and development works have been undertaken to produce various electric vehicles propelled with electric vehicle motors instead of engines. As a typical example of such an electric vehicle, a development work has rapidly been proceeded to provide a fuel cell powered vehicle which employs a proton exchange membrane type fuel cell (hereinafter referred to as PEM type fuel cell) which is abbreviated as, for example, PEMFC (Proton Exchange Membrane Fuel Cell).

The PEM type fuel cell is constructed of a stack whose structure is composed of a plurality of unit cells each for generating electric power output. Each of the unit cells is constructed having an anode side separator formed with a hydrogen gas flow passage, a cathode side separator formed with an oxygen flow passage, and a membrane and electrode joint member, which is sandwiched between two separators and which is abbreviated as MEA (Membrane Electrode Assembly). One surface of the proton exchange membrane of the MEA carries thereon an anode side electrode catalyst layer and a gas dispersion layer which are sequentially stacked, and the other side of the proton exchange membrane carries a cathode side electrode catalyst layer and a dispersion layer which are sequentially stacked.

In such a PEM type fuel cell, the presence of a humid condition of the MEA allows hydrogen ion to pass through the proton exchange membrane to the cathode side to cause each unit cell to generate an electromotive force of about 1 V. Further, the PEM type fuel cell is arranged to produce the most stable power output in a temperature circumference of, for example, about 75 to 85° C., with a specific electric circuitry being configured to propel the electric vehicle motor through a power drive unit and a power output current control unit.

It has been a usual practice to have the fuel cell powered vehicle, on which the PEM type fuel cell is mounted, equipped with a cooling system for maintaining the fuel cell within a given temperature range. For example, U.S. Pat. No. 5,605,770 discloses a cooling system which comprises a primary cooling circuit for circulating primary coolant to cool the fuel cell, and a secondary cooling circuit for circulating secondary coolant which can be heat exchanged with the primary coolant and which is circulated through a radiator of the vehicle. In such a fuel cell powered vehicle, also, a cooling system is located in the vehicle for cooling a heat generating source composed of the fuel cell and the electric vehicle motor. For example, Japanese Laid-open Patent Publication No. 11-178116 discloses a cooling system for cooling the fuel cell and the vehicle propelling motor (electric vehicle motor) with coolant water which circulates through the radiator equipped with an electric motor driven fan.

In the cooling system for the prior art fuel cell powered vehicle disclosed in the above US patent, a circulation pump, which circulates primary coolant in the primary cooling circuit, and a circulation pump, which circulates the secondary coolant in the secondary cooling circuit, are mounted in the vehicle independently of each other. As a consequence, these circulation pumps require two discrete electric motors. Also, in order to control the amount of the primary coolant to be circulated and the amount of the secondary coolant to be circulated to optimum values for thereby maintaining the fuel cell to a suitable temperature range, a complicated, cooperative control is required to control the two discrete electric motors in a mutually operating relationship.

On the other hand, in the cooling system disclosed in the above Japanese Patent Publication No. 11-178116, the presence of the flow of coolant water allows for the fuel cell, a compressor, a fuel cell system, which includes a reformer, a power converter and a vehicle propelling motor (the electric vehicle motor) to be cooled. As a consequence, the aforementioned radiator is required to have a large cooling capacity, with a resultant increase in the size of the radiator. Further, a problem is encountered in the prior art cooling system in that it is difficult to cool the fuel cell and the electric vehicle motor to respective optimum temperatures. Although such a problem can be solved by separately locating the cooling system for the fuel cell and the cooling system for the electric vehicle motor etc. to be completely independent from one another, a flow path of the cooling system suffers from an unduly extended length.

SUMMARY OF THE INVENTION

It is therefore a first object of the present invention to provide a cooling system for a fuel cell powered vehicle wherein it is easy to control a circulation pump of coolant liquid and a fuel cell can be cooled to a suitable temperature range with primary coolant which is heat exchanged with secondary coolant.

It is a second object of the present invention to provide a cooling system for a fuel cell powered vehicle wherein it is possible to cool a fuel cell to maintain it to a suitable temperature range while allowing a heat generating source composed of an electric vehicle motor etc. to be efficiently cooled to a suitable temperature range without causing the cooling system to be largely sized in structure and to be equipped with a conduit with an unduly extended length.

According to a first aspect of the present invention, there is provided a cooling system for a fuel cell powered vehicle wherein a fuel cell is mounted as a power source of an electric vehicle motor. The cooling system comprises a primary circulation passage arranged to allow primary coolant to be circulated through a primary circulation pump to cool the fuel cell, a secondary circulation passage arranged to circulate secondary coolant through a secondary circulation pump, a primary heat exchanger for achieving heat exchange between the primary coolant and the secondary coolant, and a secondary heat exchanger for achieving heat exchange between the secondary coolant and the flow of outside air. The primary and secondary circulation pumps are connected to and driven with rotatable shafts of a single pump drive motor, respectively.

According to a second aspect of the present invention, there is provided a cooling system for a fuel cell powered vehicle wherein a fuel cell is mounted as a power source of an electric vehicle motor. The cooling system comprises a primary circulation passage arranged to allow primary coolant to be circulated through a primary circulation pump to cool the fuel cell, a secondary circulation passage arranged to circulate secondary coolant through a secondary circulation pump to cool a heat generating source including at least the electric vehicle motor, a first heat exchanger for achieving heat exchange between the primary coolant of the primary circulation passage and the secondary coolant of the secondary circulation passage, and second and third heat exchangers for achieving heat exchange between the secondary coolant of the secondary circulation passage and the flow of outside air. The secondary circulation passage includes a main circulation flow passage for circulating the secondary coolant through the secondary circulation pump and the second and third heat exchangers, and a sub-circulation flow passage for circulating the secondary coolant through the secondary circulation pump, the third heat exchanger, the heat generating source including at least the electric vehicle motor, and the second circulation pump.

According to a third aspect of the present invention, there is provided a cooling system for a fuel cell powered vehicle having a fuel cell serving as a power source for propelling an electric vehicle motor. The cooling system comprises a primary circulation passage connected to the fuel cell and including a primary circulation pump for circulating primary coolant in the primary circulation passage to maintain the temperature of the fuel cell at a given temperature, a first heat exchanger having first and second flow passages, with the first flow passage being located in the primary circulation passage, a secondary circulation passage connected to a heat generating source composed of at least the electric vehicle motor and including a secondary circulation pump for circulating secondary coolant in the secondary circulation passage, with the secondary circulation passage being located in the second flow passage of the first heat exchanger to achieve heat exchange between the primary coolant and the secondary coolant, and a single pump drive motor including rotatable shafts connected to and drive the primary and secondary circulation pumps, respectively.

According to a fourth aspect of the present invention, there is provided a fuel cell powered vehicle comprises a fuel cell serving as a power source, an electric vehicle motor powered by the fuel cell for propelling the vehicle, a primary circulation passage connected to the fuel cell and including a primary circulation pump for circulating primary coolant in the primary circulation passage to maintain the temperature of the fuel cell at a given temperature, a first heat exchanger having first and second flow passages, with the first flow passage being located in the primary circulation passage, a secondary circulation passage connected to a heat generating source composed of at least the electric vehicle motor and including a secondary circulation passage for circulating secondary coolant in the secondary circulation passage, with the secondary circulation passage being located in the second flow passage of the first heat exchanger to achieve heat exchange between the primary coolant and the secondary coolant, and a single pump drive motor including rotatable shafts connected to and drive the primary and secondary circulation pumps, respectively.

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENTS

Figure 1:
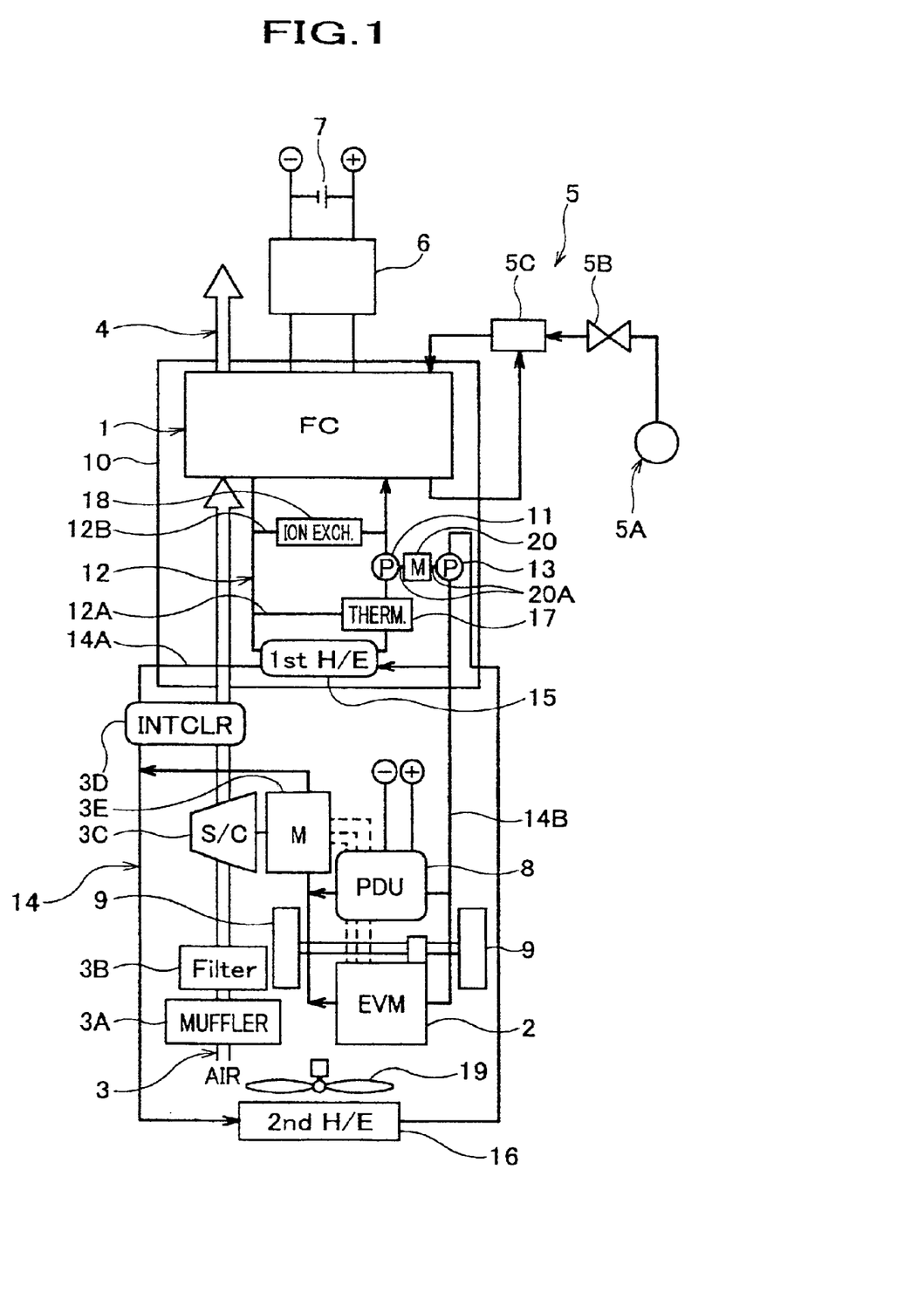
FIG. 1 is a schematic block diagram illustrating a first preferred embodiment of a fuel cell powered vehicle according to the present invention and a cooling system associated therewith.
Figure 2:
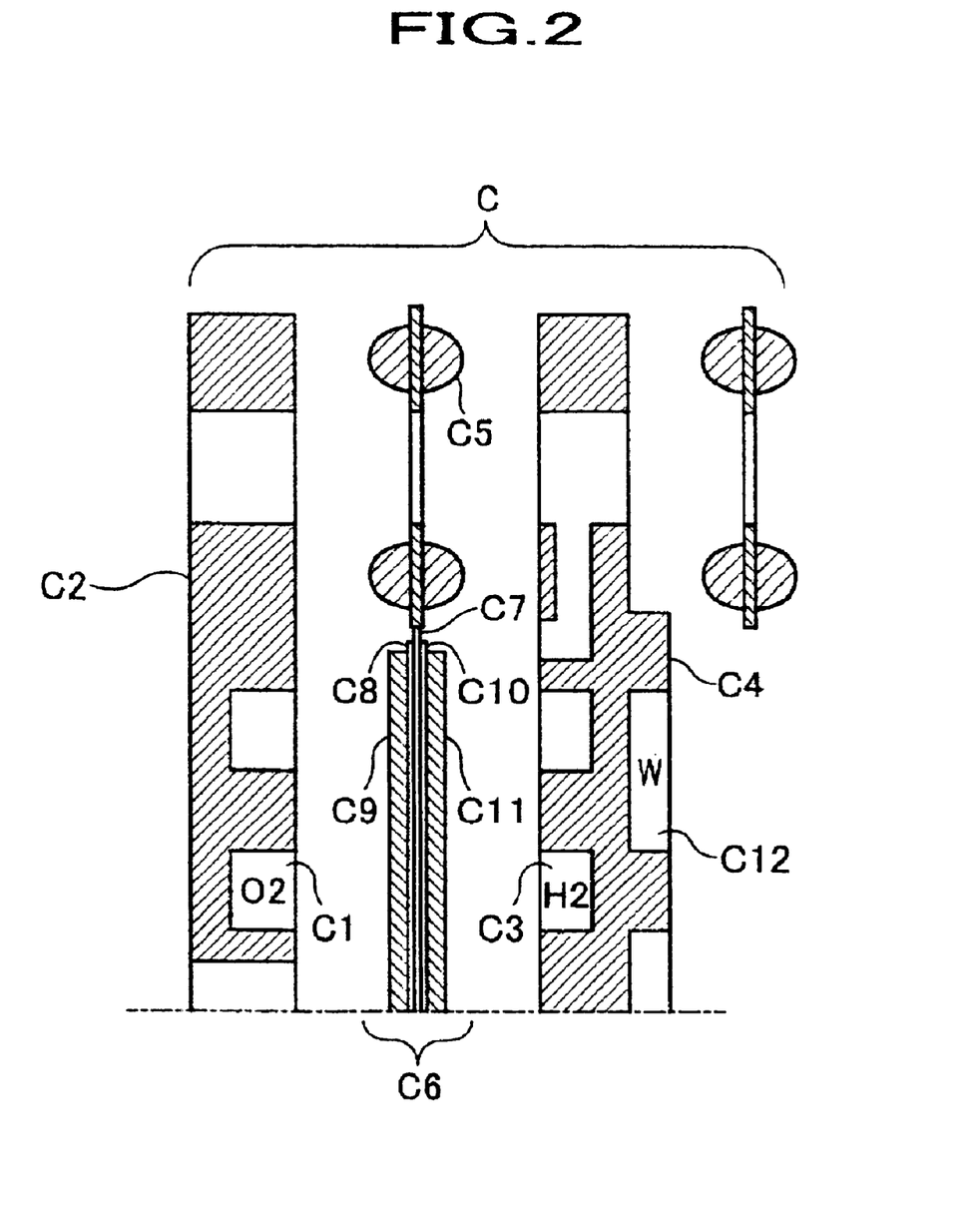
FIG. 2 is a partial cross sectional view of a cell structure of a fuel cell shown in FIG. 1.

A first preferred embodiment of a cooling system for a fuel cell powered vehicle according to the present invention will be described with reference to FIGS. 1 and 2, wherein FIG. 1 is a block diagram showing the cooling system of the first preferred embodiment and FIG. 2 is a cross sectional view of a part of a cell structure of a fuel cell shown in FIG. 1.

In FIG. 1, the cooling system of the first preferred embodiment according to the present invention is suited for a fuel cell powered vehicle which carries a fuel cell (FC) 1 as a power supply for an electric vehicle motor (EVM) 2. The fuel cell powered vehicle includes an air supply system 3 which supplies air (oxygen) to a cathode of the fuel cell (FC) 1, and an exhaust system 4 for the fuel cell 1. Also, the fuel cell powered vehicle includes a hydrogen gas supply system 5 to supply hydrogen gas to an anode of the fuel cell (FC) 1.

The air supply system 3 of the fuel cell 1 includes a muffler 3A, an air filter 3B, a supercharger (S/C) 3C and an intercooler (INTCLR) 3D, which are sequentially located from an upper stream side toward a downstream side. Further, the hydrogen gas supply system 5 of the fuel cell 1 includes a hydrogen tank 5A, a control valve 5B and an ejector 5C, which are sequentially located from an upper stream side toward a downstream side, such that hydrogen gas recovered from the fuel cell 1 is circulated to the ejector 5C.

The fuel cell 1 is arranged in circuitry to supply power output to both a battery 7 and a power drive unit (PDU) 8 via an output power current control device (DC/DC) 6. In addition, the power drive unit 8 is arranged in circuitry so as to control operations of the electric vehicle motor 2 and a drive motor 3E of the supercharger 3C. Furthermore, the electric vehicle motor 2 is connected to drive wheels 9, 9 of the fuel cell powered vehicle through a drive connection. In addition, the fuel cell 1 is mounted in a fuel cell box 10 located below a passenger floor of the fuel cell powered vehicle.

The fuel cell 1 is a PEM type fuel cell, which is constructed with a large number of stacks of cells each serving as a unit for electric power generation, and which operates to produce electric power at the most stable fashion in a temperature range of, for example, about 75 to 85° C. Here, as shown in FIG. 2, each cell C, which forms the fuel cell 1, includes a cathode-sided separator C2 which is internally formed with an oxygen supply passageway C1, an anode-sided separator C4 which is internally formed with a hydrogen supply passageway C3, and a membrane electrode assembly (MEA) C6 which is sandwiched between the cathode-sided separator C2 and the anode-sided separator C4. The membrane electrode assembly C6 is constructed having a proton exchange membrane C7 which carries on its one side a cathode-sided electrode catalyst layer C8 and a gas diffusion layer C9 that are sequentially stacked, and which carries on the other side an anode-sided electrode catalyst layer C10 and a gas diffusion layer C11 that are sequentially stacked. In addition, an outer surface of the anode-sided separator C4 is formed with a coolant passageway C12.

As shown in FIG. 1, the cooling system of the first preferred embodiment for the fuel cell powered vehicle includes a primary circulation passage 12 which includes a primary circulation pump 11 that circulates primary coolant through the fuel cell 1 to cool the same, and a secondary circulation passage 14 that includes a secondary circulation pump 13 that circulates secondary coolant through the electric vehicle motor 2, the power drive unit 8, the drive motor 3E of the supercharger 3C and the output power current control device 6 to cool these components. Further, a primary heat exchanger 15 is located to achieve heat exchange between the primary coolant flowing through the primary circulation passage 12 and the secondary coolant flowing through the secondary circulation passage 14, and a secondary heat exchanger 16 is located to achieve heat exchange between the secondary coolant flowing through the secondary circulation passage 14 and outside air. Also, the output power current control device 6 is connected to the secondary circulation passage 14, which is not shown in FIG. 1.

The primary circulation passage 12 is mainly constructed with a circulation flow passage in which the primary coolant is circulated through the primary circulation pump 11, the coolant flow passage C12 of the fuel cell 1 and the primary heat exchanger 15. A thermostat-controlled valve 17 is located between the primary heat exchanger 15 and the primary circulation pump 11, and a first bypass flow passage 12A branched off from the thermostat-controlled valve 17 is connected in parallel to the primary heat exchanger 15. The thermostat-controlled valve 17 is designed to open at the temperature of for example 85° C. such that when the temperature of the primary coolant is at least below 75° C., the thermostat-controlled valve 17 closes fluid communication between the primary circulation pump 11 and the primary heat exchanger 15 whereas when the temperature of the primary coolant exceeds 85° C., the thermostat-controlled valve 17 establishes the above fluid communication.

In the primary circulation passage 12, further, a second bypass flow passage 12B, which is branched off at a point between the primary circulation pump 11 and the fuel cell 1, is connected in parallel to the first bypass flow passage 12A. In the second bypass flow passage 12B, further, an ion exchanger 18 is located to absorb metallic ion dissolved in the primary circulation passage 12.

The primary circulation passage 12, which is equipped with the first bypass flow passage 12A and the second bypass flow passage 12B, is received in the fuel cell box 10 with the primary heat exchanger 15. The primary heat exchanger 15 is located in the vicinity of the fuel cell 1 and, consequently, the length of the conduit of the primary circulation passage 12 is shortened. Further, the primary circulation passage 12 is made of stainless steel or an electrically insulation material such as plastic that are highly resistant in dissolving ion to avoid liquid junction or liquid short-circuit phenomenon. In order to avoid liquid short-circuit phenomenon, it is preferable for the primary coolant to be composed of pure water having a low electric conductivity and an anti-freezing solution, such as ethylene glycol, which is referred to as long life coolant (LLC), but the primary coolant maybe composed of electrically insulating oil.

The secondary circulation passage 14 includes a first circulation flow passage 14A for circulating secondary coolant through the secondary circulation pump 13, the first heat exchanger 15, the intercooler 3D and the second heat exchanger 16. Also, the secondary circulation passage 14 includes a second circulation flow passage 14B to allow secondary coolant to be branched off at a point between the circulation pump 13 and the first heat exchanger 15 and to join at a point between the intercooler 3D and the secondary heat exchanger 16. Further, the second circulation flow passage 14B includes a first water jacket (not shown) formed in a heat sink of the power drive unit 8, and a second water jacket (not shown) formed in a periphery of a stator of the electric vehicle motor 2, with the first and second water jackets being mutually arranged in parallel to one another and connected in series at their downstream sides to a third water jacket (not shown), which is formed in a periphery of the stator of the drive motor 3E.

The primary heat exchanger 15 is a liquid coolant type heat exchanger which allows the primary coolant, which circulates through the primary circulation passage 12, in heat exchange with the secondary coolant which circulates through the first circulation flow passage 14A of the secondary circulation passage 14. Further, the secondary heat exchanger 16 is an air cooling type heat exchanger having an electric cooling fan 19 for cooling the secondary coolant, which circulates through the secondary circulation passage 14, with air flow created during traveling of the vehicle and air flow created by the electric fan 19.

Figure 3:
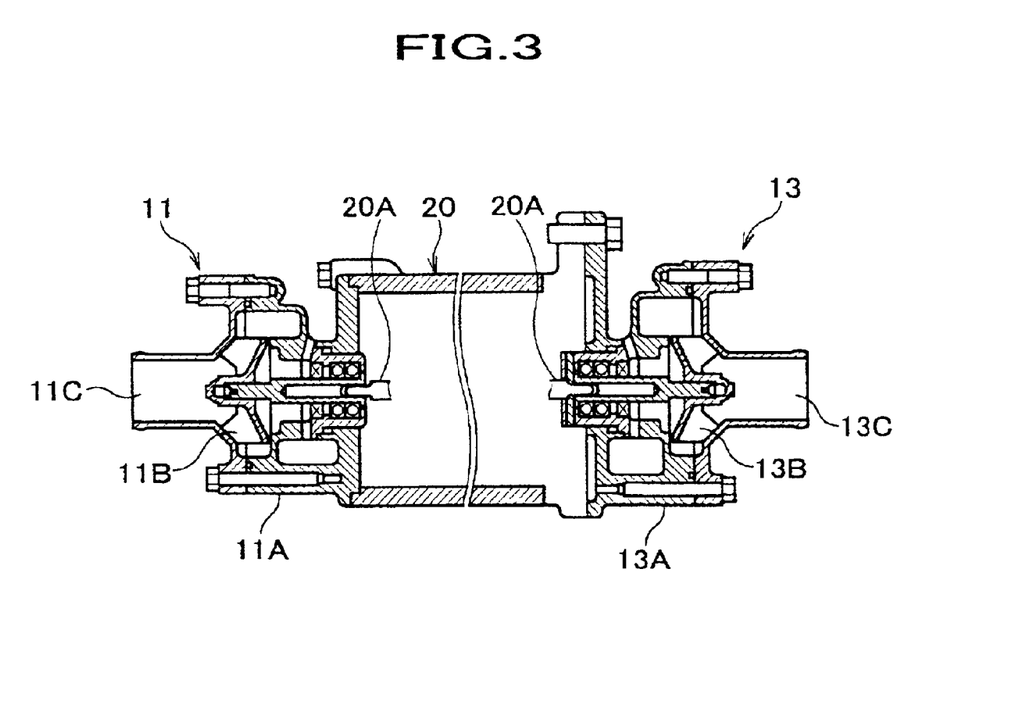
FIG. 3 is a cross sectional view for illustrating a connection between a single pump drive motor and primary and secondary circulation pumps associated therewith.

As shown in FIG. 3, the primary circulation pump 11 and the secondary circulation pump 13 are connected to and driven with rotatable shafts 20A, 20A of a single pump drive motor 20. In particular, a housing 11A of the primary circulation pump 11 is coupled to one side of the single pump drive motor 20, and an impeller 11B of the primary circulation pump 11 is mounted to one of the rotatable shafts 20A. Likewise, a housing 13A of the secondary circulation pump 13 is fixed to the other side of the single pump drive motor 20, and an impeller 13B of the secondary circulation pump 13 is mounted to the other one of the rotatable shafts 20A.

Further, the primary circulation passage 12, in which the primary circulation pump 11 is located, is subjected to pressure losses caused by the coolant flow passage C12 and, so, an inner diameter of a fluid inlet 11C of the primary circulation pump 11 is designed to be slightly larger than that of an inner diameter of a fluid inlet 13C of the secondary circulation pump 13. More particularly, the fluid inlet 11C has the inner diameter of, for example, 29 mm and the fluid inlet 13C of the secondary circulation pump 13 has the inner diameter of, for example, 27 mm.

Figure 4A:
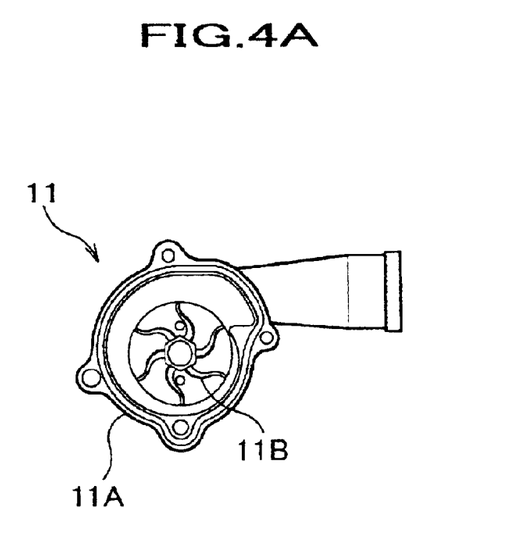
FIG. 4A is a front view of an impeller of the primary circulation pump shown in FIG. 3.
Figure 4B:
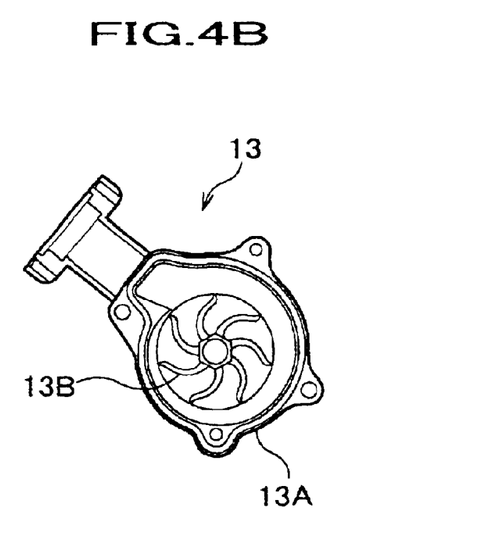
FIG. 4B is a front view of an impeller of the secondary circulation pump shown in FIG. 3.

The impeller 11B of the primary circulation pump 11 has six blades as viewed in FIG. 4A, and the impeller 13B of the secondary circulation pump 13 has seven blades as seen in FIG. 4B. The impeller 11B, composed of the six blades, of the primary circulation pump 11 is designed to have a diameter slightly smaller than that of the impeller 13B, composed of the seven blades, of the secondary circulation pump 13. More particularly, the impeller 11B of the primary circulation pump 11 is designed to have a diameter of, for example, 45 mm and the impeller 13B of the secondary circulation pump 13 has the inner diameter of, for example, 53 mm.

The pump drive motor 20 is a high voltage powered motor, which is controlled with the power drive unit 8. The pump drive motor 20 is arranged to drive the primary circulation pump 11 and the secondary circulation pump 13 at the same rotational speeds to provide a desired flow rates. A mutual ratio of the flow rates of the primary and secondary circulation pumps 11 and 13 is determined in accordance with characteristics of the primary circulation passage 12 such as a specific heat representing a thermal capacity of the primary coolant and a density thereof, the amount of heat produced by the fuel cell 1 and a heat exchange rate of the primary heat exchanger 15, and characteristics of the secondary circulation passage 14 such as the specific heat representing the thermal capacity of the secondary coolant and the density thereof and a heat exchange rate of the secondary heat exchanger 16.

That is, under conditions wherein the pump drive motor 20 is rotating at a prescribed speed, the secondary heat exchanger 16 discharges heat at a prescribed temperature with a given air flow rate and the fuel cell 1 generates the maximum power output, the flow rate of the primary circulation pump 11 is determined so as to allow a difference between the temperature of the primary coolant flowing through the inlet side of the primary heat exchanger 15 and the temperature of the primary coolant flowing through the outlet side of the primary heat exchanger 15 to remain in a prescribed value (that, for example, 10° C.). Further, the flow rate of the secondary circulation pump 13 is determined so as to allow the temperature of the primary coolant flowing through the outlet side of the primary heat exchanger 15 to remain at a prescribed temperature (that is, for example, 75° C.). More particularly, the ratio of flow rates between the primary circulation pump 11 and the second circulation pump 13 are determined such that the temperature of the primary coolant flowing through the inlet side of the primary heat exchanger 15 remains at 85° C., the temperature of the primary coolant flowing through the outlet side of the primary heat exchanger 15 remains at 75° C., the temperature of the secondary coolant flowing through the inlet side of the secondary heat exchanger 16 remains at 70° C. and the temperature of the secondary coolant flowing through the outlet of the secondary heat exchanger 16 remains at 60° C.

In the cooling system of the first preferred embodiment thus constructed in the fuel cell powered vehicle, the single pump drive motor 20 is driven with the power drive unit 8 such that the primary circulation pump 11 and the secondary circulation pump 13 are driven at the same rotational speeds and at the prescribed ratio of flow rates, thereby allowing the primary coolant and the secondary coolant to circulate through the primary circulation passage 12 and the secondary circulation passage 14, respectively, at the prescribed ratio of flow rates.

Here, when the fuel cell 1 remains in a cold stage wherein the temperature of the primary coolant flowing through the thermostat-controlled valve 17 of the primary circulation passage 12 is below 85° C., the thermostat-controlled valve 17 closes the outlet side of the primary heat exchanger 15, thereby allowing the primary coolant to flow from the primary circulation pump 11 through the coolant flow passage C12 of the fuel cell 1, the first bypass flow passage 12A and the thermostat-controlled valve 17 to the primary circulation pump 11. In addition, the primary coolant, which circulates while bypassing the primary heat exchanger 15, absorbs heat when it flows through the coolant flow passage C12 of the fuel cell 1 for thereby gradually increasing the temperature of the primary coolant, with a resultant warming-up of the fuel cell 1. In this event, since the length of the conduit of the primary circulation passage 12 is shortened and the amount of the primary coolant to be circulated remains at a small value, the temperature of the primary coolant is shortly increased to the neighbor of about 85° C. Accordingly, the warm-up of the fuel cell 1 is quickly completed.

When the temperature of the primary coolant, which passes through the thermostat-controlled valve 17 of the primary circulation passage 12, reaches at the temperature of 85° C. and the warm-up of the fuel cell 1 is completed, the thermostat-controlled valve 17 opens the flow path at the outlet side of the primary heat exchanger 15 and the primary coolant circulates in the primary circulation passage 12 through the primary circulation pump 11, the coolant flow passage C12 of the fuel cell 1, the primary heat exchanger 15 and the thermostat-controlled valve 17. In addition, the primary coolant, which circulates through the primary heat exchanger 15, flows through the coolant flow passage C12 of the fuel cell 1 and absorbs heat produced thereby while cooling the same, allowing the primary heat exchanger 15 to achieve heat exchange with the secondary coolant of the secondary circulation passage 14 for thereby discharging heat. Thus, the temperature of the primary coolant is maintained at 85° C. at the inlet side of the primary heat exchanger 15 and is maintained at 75° C. at the outlet side of the primary heat exchanger 15.

On the other hand, the secondary coolant flows first from the secondary circulation pump 13 through the primary heat exchanger 15 of the first circulation flow passage 14A and the intercooler 3D into the second heat exchanger 16 and also flows through the water jacket (not shown) of the electric vehicle motor 2 of the secondary circulation flow passage 14B, the water jacket (not shown) of the power drive unit 8, the water jacket (not shown) of the drive motor 3E and water jacket (not shown) formed in the heat sink of the output power current control device 6 into the secondary heat exchanger 16. Then, the secondary coolant circulates into the secondary circulation pump 13. When circulated, the secondary coolant absorbs heat in heat exchange with the primary coolant of the primary circulation passage 12 via the primary heat exchanger 15. When the secondary coolant passes through the intercooler 3D, the secondary coolant absorbs heat in heat exchange with air compressed with the supercharger 3C of the air supply system 3 and, also, cools the electric vehicle motor 2, the drive motor 3E, the power drive unit 8 and the output power current control device 6 while absorbing heat, discharging heat in heat exchange with the flow of outside air drawn by the electric cooling fan 19 or air flow created during traveling of the vehicle. In this manner, the temperature of the secondary coolant is maintained at 70° C. at the inlet side of the secondary heat exchanger 16 and at 60° C. at the outlet side of the secondary heat exchanger 16.

Consequently, in accordance with the cooling system of the first preferred embodiment of the fuel cell powered vehicle, a simple control of operation of the single pump drive motor 20 allows the primary coolant, which has been cooled by the secondary coolant, to cool the fuel cell 1 within a suitable temperature range. Also, with such a secondary coolant, it is possible to cool the electric vehicle motor 2, the power drive unit 8, the drive motor 3E and the output power current control device 6 independently of the fuel cell 1.

Furthermore, the presence of the primary heat exchanger 15 located in close proximity to the fuel cell 1 allows the length of the conduits of the primary circulation passage 12 to be shortened. As a consequence, the amount of the primary coolant to be required to cool or warm up the fuel cell 1 is decreased such that, during warming up of the fuel cell 1, the temperature of the primary coolant is quickly increased, with a resultant decrease in the warming-up time period.

Furthermore, in the cooling system of the first preferred embodiment for the fuel cell powered vehicle, since the primary circulation passage 12 is constructed with a material, which is not dissolving ion, such as stainless steel or electrically insulation material such as plastic, the primary coolant may be composed of pure water having low electric conductivity, the LLC or electrically insulating oil, thereby preventing the fuel cell 1 from encountering the liquid short-circuit phenomenon. Since, in this event, the LLC or the electrically insulating oil has a low freezing point, thereby avoiding damages or deteriorations caused in the cooling system even in a cold area.

Figure 5:
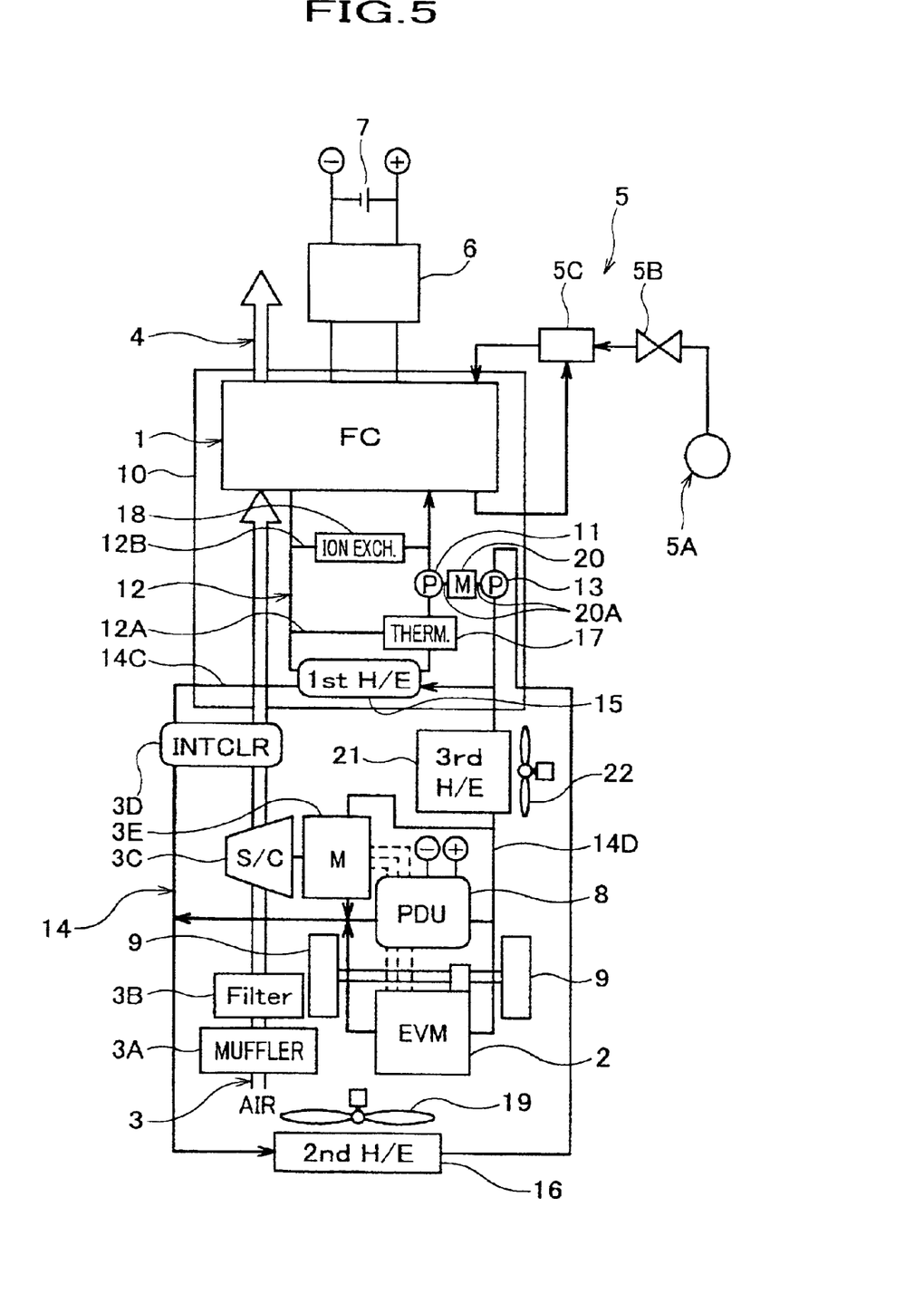
FIG. 5 is a schematic block diagram of a second preferred embodiment of a fuel cell powered vehicle according to the present invention and a cooling system associated therewith.

FIG. 5 shows a cooling system of a second preferred embodiment according to the present invention suited for a fuel cell powered vehicle. The cooling system of the second preferred embodiment for use in the fuel cell powered vehicle is constructed substantially in the same manner as the cooling system of the first preferred embodiment, with like parts bearing the same reference numerals as those used in FIG. 1 while omitting detailed description of the similar parts.

As shown in FIG. 5, the cooling system of the second preferred embodiment includes a primary circulation passage 12 adapted to enable to cool the fuel cell 1 with primary coolant which is circulated by the primary circulation pump 11, and the secondary circulation passage 14 adapted to cool the electric vehicle motor 2, which is a heat generating source, the power drive unit 8, the drive motor 3E of the supercharger 3C and the output power current control device 6 with the use of the secondary coolant which is circulated by the secondary circulation pump 13. Further, the cooling system includes the first heat exchanger 15 which achieves heat exchange between the primary coolant in the primary circulation passage 12 and the secondary coolant in the secondary circulation passage 14, the second heat exchanger 16 which achieves heat exchange between the secondary coolant in the secondary circulation passage 14 and the flow of outside air, and a third heat exchanger 21. It is to be noted here that the connection between the secondary circulation passage 14 and the output power current control device 6 is omitted for the sake of simplicity in FIG. 5.

The secondary circulation passage 14 includes a main circulation flow passage 14C wherein the secondary coolant is circulated through the secondary circulation pump 13, the first heat exchanger 15, the intercooler 3D and the second heat exchanger 16 and the second circulation pump 13. Further, the secondary circulation passage 14 includes a sub-circulation flow passage 14D wherein the secondary coolant is circulated from the secondary circulation pump 13 through the third heat exchanger 21, the electric vehicle motor 2, which is the source of heat, the power drive unit 8, the drive motor 3E of the supercharger 3C, the output power current control device 6 and the second heat exchanger 16 to the secondary circulation pump 13.

The electric vehicle motor 2, the power drive unit 8, the drive motor 3E of the supercharger 3C and the output power current control device 6 are mutually connected in parallel to the sub-circulation flow passage 14D. That is, the water jacket (not shown) formed in a periphery of the stator of the electric vehicle, the water jacket (not shown) formed in the heat sink of the power drive unit 8, the water jacket (not shown) formed in the periphery of the stator of the drive motor 3E and the water jacket (not shown) formed in the heat sink of the output power current control device 6 are mutually connected in parallel to the sub-circulation flow passage 14D.

The first heat exchanger 15 is a liquid type heat exchanger adapted to cool the primary coolant, which is circulated through the primary circulation passage 12, with the use of the secondary coolant which is circulated through the main circulation flow passage 14C of the secondary passage 14. Further, the second heat exchanger 16 is an air-cooling type heat exchanger equipped with the electric cooling fan 19, wherein the secondary coolant, which is circulated through the secondary circulation passage 14, is cooled with air flow created by the electric cooling fan 19. Furthermore, the third heat exchanger 21 is an air-cooling type heat exchanger equipped with the electric cooling fan 22 wherein the secondary coolant, which is circulated through the sub-circulation flow passage 14D, is cooled with air flow created by the electric cooling fan 22.

The ratio of flow rates of the primary circulation pump 11 and the secondary circulation pump 13 are determined in accordance with a first operating characteristic such as the specific heat representing the heat capacity of the primary coolant and the density thereof, the amount of heat of the fuel cell 1 and the heat exchange rate of the first heat exchanger 15, and a second operating characteristic such as the specific heat representing the heat capacity of the secondary coolant and the density thereof, the amount of heat of the fuel cell 1 and the heat exchange rate of the second heat exchanger 16 and the third heat exchanger 21.

That is, under conditions wherein the pump drive motor 20 is rotating at a prescribed speed and the second and third heat exchangers 16 and 21 discharge heat at the prescribed temperature in heat exchange with the given amount of air flow and the fuel cell 1 generates the maximum power output, the flow rate of the primary circulation pump 11 is determined such that the temperature difference between the temperature of the primary coolant flowing through the inlet side of the first heat exchanger 15 and the temperature of the primary coolant flowing through the outlet of the first heat exchanger 15 remains within a prescribed value (that is, for example, 10° C.). Also, the flow rate of the secondary circulation pump 13 is determined such that the temperature of the primary coolant flowing through the outlet side of the first heat exchanger 15 remains within the prescribed value (that is, for example, 75° C.) In particular, the ratio of the flow rates of the primary and secondary circulation pumps 11 and 13 is determined such that the temperature of the primary coolant flowing at the inlet side of the first heat exchanger 15 remains at 85° C., the temperature of the primary coolant flowing at the outlet side of the first heat exchanger 15 remains at 75° C., the temperature of the secondary coolant flowing through the outlet side of the second heat exchanger 16 remains at 60° C. and the temperature of the secondary coolant flowing through the inlet side of the second heat exchanger 16 remains at 70° C.

In the cooling system thus arranged in the fuel cell powered vehicle, since the single pump drive motor 20 is driven with the power drive unit 8, the primary circulation pump 11 and the secondary circulation pump 13 are driven at the same given rotational speeds and at the ratio of the given flow rates, in which the primary coolant is circulated through the primary circulation passage 12 and the secondary coolant is circulated through the main circulation flow passage 14C and the sub-circulation flow passage 14D of the secondary circulation passage 14.

Now, in the event the fuel cell 1 remains in a cold stage wherein the temperature of the primary coolant, which passes through the thermostat-controlled valve 17 of the primary circulation passage 12, is below 85° C., the thermostat-controlled valve 17 closes the flow path at the outlet side of the first heat exchanger 15. In this event, the primary coolant is circulated through the primary circulation pump 11, the coolant flow passage C12 of the fuel cell 1, the bypass passage 12A and the thermostat-controlled valve 17. Further, the primary coolant, which is circulated while detouring the first heat exchanger 15, passes through the coolant flow passage of the fuel cell 1, with a resultant heat absorption to induce a gradual temperature increase to allow the fuel cell 1 to be warmed up. Since, in this event, the primary circulation passage has the conduit with the shortened length and the amount of the primary coolant to be circulated is small, the temperature of the primary coolant is raised to the vicinity of 85° C. in a short time period. Accordingly, the warm-up of the fuel cell 1 is quickly completed.

When the temperature of the primary coolant, which passes through the thermostat-controlled valve 17 of the primary circulation passage 12, reaches at the temperature 85° C. to complete the warm-up operation, the thermostat-controlled valve 17 opens the flow path at the outlet side of the first heat exchanger 15. As a consequence, the primary coolant is circulated through the primary circulation pump 11, the coolant flow passage C12 of the fuel cell 1, the first heat exchanger 15 and the thermostat-controlled valve 17. Further, the primary coolant, which is circulated through the first heat exchanger 15, passes through the coolant flow passage of the fuel cell 1, with a resultant heat absorption while cooling the fuel cell 1 with a resultant heat exchange with the secondary coolant of the secondary circulation passage 14 by means of the first heat exchanger 15 for thereby discharging heat. Since, in this event, the temperature of the primary coolant is maintained at about 85° C. at the inlet side of the first heat exchanger 15 and is maintained at about 75° C. at the outlet side of the first heat exchanger 15.

The secondary coolant branches from the secondary circulation pump 13 toward the first heat exchanger 15 on one side such that the secondary coolant is circulated through the intercooler 3D, the second heat exchanger 16 and the second circulation pump 13 in a main circulation flow passage 14C. Further, the secondary coolant, which is circulated through the main circulation flow passage 14C, passes through the first heat exchanger 15 and absorbs heat in heat exchange with the primary coolant of the primary circulation passage 12. Also, the secondary coolant flows through the intercooler 3D and absorbs heat in heat exchange with air, which is compressed and heated with the supercharger 3C of the air supply system 3, and passes through the second heat exchanger 16, thereby discharging heat in heat exchange with the flow of outside air, created during cruising of the vehicle or drawn by the electric motor driven cooling fan 19.

Also, the secondary coolant branches from the secondary circulation pump 13 toward the third heat exchanger 21 on the other side such that the secondary coolant flows through the electric vehicle motor 2, the drive motor 3E of the supercharger 3C, the power drive unit 8, the output power current control unit 6 and the second heat exchanger 16 to the secondary circulation pump 13 to achieve circulation in a sub-circulation flow passage 14D. Further, the secondary coolant, which passes through the sub-circulation flow passage 14D, passes through the third heat exchanger 21 and discharges heat in heat exchange with the flow of outside air drawn by the electric motor driven cooling fan 22. Then, the secondary coolant flows through the water jacket (not shown) of the electric vehicle motor 2, the water jacket (not shown) of the drive motor 3E, the water jacket (not shown) of the power drive unit 8 and the water jacket (not shown) formed in the heat sink of the output power current control unit 6 such that all of these components are cooled to absorb heat, and joins at the second heat exchanger 16 which discharges heat in heat exchange with the flow of wind created during cruising of the vehicle or the flow of outside air drawn by the electric motor driven cooling fan 19.

Thus, the temperature of the secondary coolant is maintained at about 65° C. at the inlet side of the first heat exchanger 15 and at about 75° C. at the outlet side hereof, and is also maintained at about 75° C. at the inlet side of the second heat exchanger 16 and at about 65° C. at the outlet side thereof. Also, the temperature of the secondary coolant is maintained at about 65° C. at the inlet side of the third heat exchanger 21 and at about 60° C. at the outlet side thereof.

In accordance with the second preferred embodiment of the cooling system of the fuel cell powered vehicle, consequently, it is possible for the fuel cell 1 to be cooled with the primary coolant, whose heat is discharged by the first heat exchanger 15, to be maintained at the temperature ranging from 75° C. to 85° C. Also, it is possible for the heat generating source composed of the electric vehicle motor 2, the drive motor 3E of the supercharger 3C, the power drive unit 8 and the output power current control unit 6 to be efficiently cooled with the secondary coolant, whose heat is discharged with the second and third heat exchangers 16 and 21, to be maintained at a suitable temperature.

On the other hand, since the second preferred embodiment of the cooling system of the fuel cell powered vehicle includes the first heat exchanger 15 which functions as a heat discharge unit for the primary coolant which cools the fuel cell 1, and the second and third heat exchangers which function as heat discharging units for the secondary coolant which cools the heat generating source composed of the electric vehicle motor 2, the drive motor 3E of the supercharger 3C, the power drive unit 8 and the output power current control unit 6, it is possible to prevent the heat exchangers to be largely sized while avoiding an increased size of the cooling system. In addition since the first heat exchanger 15 is arranged in a configuration wherein the primary coolant of the primary circulation passage 12 is heat exchanged with the secondary coolant of the secondary circulation passage 14, it is possible to avoid the flow path of the cooling system from being unduly extended in length.

Furthermore, the primary and secondary circulation pumps 11 and 13, wherein the primary and secondary coolants are circulated, respectively, are connected to and driven with rotatable shafts 20A and 20A of a single common drive motor 20, respectively, the cooling system may have a simplified structure. In such a structure, further, the operation of the single pump drive motor 20 may be simply controlled, thereby allowing the fuel cell 1 to be cooled within a suitable temperature range with the use of the primary coolant adapted to be cooled with the secondary coolant. Also, the presence of the secondary coolant allows the heat generating source, composed of the electric vehicle motor 2, the drive motor 3E, the power drive unit 8 and the output power current control unit 6, to be cooled independently of the fuel cell 1.

In the illustrated embodiments of the cooling system for the fuel cell powered vehicle, further, the first heat exchanger 15 may be located in the vicinity of the fuel cell 1, with a resultant shortened length of the conduit of the primary circulation passage 12. Consequently, the amount of the primary coolant, which cools or warms up the fuel cell 1, is decreased and, during warming-up operation of the fuel cell 1, the temperature of the primary coolant increases in a short time period, thereby quickly completing the warm-up of the fuel cell 1.

In addition, since the primary circulation passage 12, which includes the bypass flow passage 12A and the communicating flow passage 12B, is made of specific material, which does not dissolve ion, such as a stainless steel pipe or an electrically insulating material such as conduits made of plastic, it is possible to employ pure water, whose electric conductivity is lowered, LLC or electrically insulating oil as the primary coolant, thereby preventing the fuel cell 1 from being short-circuited with liquid. In this event, the LLC or the insulating oil has a low freezing point, preventing the cooling system from being deteriorated in functions even in cold areas.

It will now be understood from the foregoing description that, in accordance with the first preferred embodiment of the cooling system for the fuel cell powered vehicle of the invention, the operation of the single pump drive motor allows the primary and secondary circulation pumps to rotate at the same speed to cause the primary and secondary coolants to be circulated in the primary and secondary circulation passages, respectively. Further, the primary coolant cools the fuel cell 1 while absorbing heat and discharges heat in heat exchange with the secondary coolant with the use of the primary heat exchanger. On the other hand, the secondary coolant absorbs heat in heat exchange with the primary coolant with the use of the primary heat exchanger and discharges heat in heat exchange with the flow of outside air with the use of the secondary heat exchanger. In this manner, the secondary coolant is cooled, thereby cooling the primary coolant whereby the fuel cell is cooled. In accordance with the preferred embodiment of the cooling system for the fuel cell powered vehicle, consequently, the operation of the simple pump drive motor may be simply controlled, thereby allowing the fuel cell to be cooled within the suitable temperature range with the use of the primary coolant which is cooled with the secondary coolant.

In the event the mutual ratio of the flow rates of the primary and secondary circulation pumps for circulating the primary and secondary coolants, respectively, is determined in dependence on at least the characteristics of the primary coolant and the secondary coolant and the heat discharging capacity of the secondary heat exchanger, it is possible for the fuel cell to be maintained in the suitable temperature range.

In the second preferred embodiment of the cooling system for the fuel cell powered vehicle according to the invention, the primary and secondary circulation pumps are operated such that the primary coolant is circulated through the primary circulation passage and the secondary coolant is circulated through the main circulation flow passage and the sub-circulation flow passage of the secondary circulation passage. Then, the primary coolant, which is circuited through the primary circulation passage, cools the fuel cell while absorbing heat therefrom and discharges heat in heat exchange with the secondary coolant in the first heat exchanger. On the other hand, the secondary coolant, which is circulated through the secondary circulation passage, absorb heat in heat exchange with the primary coolant in the first heat exchanger and discharges heat in heat exchange with the flow of outside air passing through the second heat exchanger. Also, the secondary coolant, which is circulated through the sub-circulation flow passage of the secondary circulation passage, discharges heat in heat exchange with the flow of outside air passing through the third heat exchanger and cools the heat generating source including the electric vehicle motor while discharging heat in heat exchange with the flow of outside air passing through the second heat exchanger.

That is, in the second preferred embodiment of the cooling system for the fuel cell powered vehicle according to the invention, the fuel cell is cooled with the primary coolant which discharges heat in the first heat exchanger and is maintained at the suitable temperature range, thereby allowing the heat generating source, including the electric vehicle motor etc., to be efficiently cooled with the secondary coolant, which discharges heat in the second and third heat exchangers, to be maintained at the suitable temperature range.

On the other hand, since the second preferred embodiment of the cooling system for the fuel cell powered vehicle according to the second invention includes the first heat exchanger, which serves as the heat discharging unit for the primary coolant for cooling the fuel cell, and the second and third heat exchangers which serve as the heat discharging units for the secondary coolant for cooling the heat generating source including the electric vehicle motor etc., it is possible for the heat discharging units and consequently the cooling system from being largely sized in structure. Further, the first heat exchanger is arranged to achieve heat exchanger between the primary coolant of the primary circulation passage and the secondary coolant of the secondary circulation passage, thereby avoiding the cooling system from having unduly extended length of the conduit.

In the preferred embodiments discussed above, although the fuel cell have been described as of the PEM type fuel cell which belongs to a polymer electrolyte membrane type fuel cell, the fuel cell may be of any other types as far as the fuel cell is mounted in the electric vehicle.

While, in the preferred embodiments, the primary and secondary circulation pumps have been described as of the impeller type, the primary and secondary circulation pumps may be of any types as far as two circulation pumps are driven with rotatable shafts of a single pump drive motor.

Also, the electric vehicle motor may be of any desired type as far as the electric vehicle motor is cooled with secondary coolant.

Further, in order to prevent the fuel cell to be short circuited in liquid, the primary circulation passage may be constructed of conduits made of electrically insulation material or a material by which an ion is difficult to dissolve to maintain the electric conductivity of the primary coolant at a lower level. In this event, although it is preferable to employ pure water or non-freezing liquid, such as ethylene glycol, which is abbreviated as LLC (Long Life Coolant) with a low freezing point in combination with an ion exchanger, the primary coolant may be composed of electrically insulation material.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims, and equivalents thereof.

What is claimed is:

1. A cooling system for a fuel cell powered vehicle wherein a fuel cell is mounted as a power source of an electric vehicle motor, the cooling system comprising:

a primary circulation passage arranged to allow primary coolant to be circulated through a primary circulation pump to cool the fuel cell;

a secondary circulation passage arranged to circulate secondary coolant through a secondary circulation pump;

a primary heat exchanger for achieving heat exchange between the primary coolant and the secondary coolant; and a secondary heat exchanger for achieving heat exchange between the secondary coolant and the flow of outside air;

wherein the primary circulation pump is connected to and driven with a first rotatable shaft of a pump drive motor and the secondary circulation pump is connected to and driven with a second rotatable shaft on an opposite side of the pump drive motor;

wherein the primary circulation pump and the secondary circulation pump are constructed such that flow rates of the primary and secondary circulation pumps are differentiated;

wherein the flow rate of the primary circulation pump is determined such that a temperature of the primary coolant flowing through an inlet side of the primary heat exchanger and a temperature of the primary coolant flowing through an outlet side of the primary heat exchanger are different to remain in a predetermined temperature difference, and wherein the flow rate of the secondary circulation pump is determined so as to allow a temperature of the primary coolant flowing through an outlet side of the primary heat exchanger to remain at a predetermined temperature.

2. A cooling system according to claim 1 wherein the primary circulation pump, the secondary circulation pump, and the pump drive motor are arranged collinearly.

3. A cooling system for a fuel cell powered vehicle having a fuel cell serving as a power source for propelling an electric vehicle motor, the cooling system comprising:

a primary circulation passage connected to the fuel cell and including a primary circulation pump for circulating primary coolant in the primary circulation passage to maintain the temperature of the fuel cell at a given temperature;

a first heat exchanger having first and second flow passages, with the first flow passage being located in the primary circulation passage;

a secondary circulation passage connected to a heat generating source composed of at least the electric vehicle motor and including a secondary circulation pump for circulating secondary coolant in the secondary circulation passage, with the secondary circulation passage being located in the second flow passage of the first heat exchanger to achieve heat exchange between the primary coolant and the secondary coolant; and a single pump drive motor including a first rotatable shaft connected to and driving the primary circulation pump and a second rotatable shaft connected to and driving the secondary circulation pump;

wherein the primary circulation pump and the secondary circulation pump are constructed such that flow rates of the primary and secondary circulation pumps are differentiated;

wherein the flow rate of the primary circulation pump is determined such that a temperature of the primary coolant flowing through an inlet side of the primary heat exchanger and a temperature of the primary coolant flowing through an outlet side of the primary heat exchanger are different to remain in a predetermined temperature difference, and wherein the flow rate of the secondary circulation pump is determined so as to allow a temperature of the primary coolant flowing through an outlet side of the primary heat exchanger to remain at a predetermined temperature.

4. A cooling system according to claim 3, further comprising a second heat exchanger located in the secondary circulation passage to achieve heat exchange between the secondary coolant and the flow of outside air.

5. A cooling system for a fuel cell powered vehicle wherein a fuel cell is mounted as a power source of an electric vehicle motor, the cooling system comprising, a primary circulation passage connected to the fuel cell and including a primary circulation pump for circulating primary coolant in the primary circulation passage to maintain the temperature of the fuel cell at a given temperature;

a first heat exchanger having first and second flow passages, with the first flow passage being located in the primary circulation passage;

a secondary circulation passage connected to a heat generating source composed of at least the electric vehicle motor and including a secondary circulation pump for circulating secondary coolant in the secondary circulation passage, with the secondary circulation passage being located in the second flow passage of the first heat exchanger to achieve heat exchange between the primary coolant and the secondary coolant;

a single pump drive motor including a first rotatable shaft connected to and driving the primary circulation pump and a second rotatable shaft connected to and driving the secondary circulation pump; and a second heat exchanger located in the secondary circulation passage to achieve heat exchange between the secondary coolant and the flow of outside air;

wherein the secondary circulation passage includes a main circulation flow passage for circulating the secondary coolant through the secondary circulation pump, the first heat exchanger and the second heat exchanger, and a sub-circulation flow passage for circulating the secondary coolant through the secondary circulation pump, the heat generating source and the second heat exchanger.

6. A cooling system according to clam 5, further comprising a third heat exchanger located in the sub-circulation flow passage to achieve heat exchange between the secondary coolant and the flow of outside air.

7. A fuel cell powered vehicle comprising:

a fuel cell serving as a power source;

an electric vehicle motor powered by the fuel cell for propelling the vehicle;

a primary circulation passage connected to the fuel cell and including a primary circulation pump for circulating primary coolant in the primary circulation passage to maintain the temperature of the fuel cell at a given temperature;

a first heat exchanger having first and second flow passages, with the first flow passage being located in the primary circulation passage;

a secondary circulation passage connected to a heat generating source composed of at least the electric vehicle motor and including a secondary circulation pump for circulating secondary coolant in the secondary circulation passage, with the secondary circulation passage being located in the second flow passage of the first heat exchanger to achieve heat exchange between the primary coolant and the secondary coolant; and a single pump drive motor including a first rotatable shaft connected to and driving the primary circulation pump and a second rotatable shaft connected to and driving the secondary circulation pump;

wherein the primary circulation pump and the secondary circulation pump are constructed such that flow rates of the primary and secondary circulation pumps are differentiated;

wherein the flow rate of the primary circulation pump is determined such that a temperature of the primary coolant flowing through an inlet side of the primary heat exchanger and a temperature of the primary coolant flowing through an outlet side of the primary heat exchanger are different to remain in a predetermined temperature difference, and wherein the flow rate of the secondary circulation pump is determined so as to allow a temperature of the primary coolant flowing through an outlet side of the primary heat exchanger to remain at a predetermined temperature.

8. A fuel cell powered vehicle according to claim 7, further comprising a second heat exchanger located in the secondary circulation passage to achieve heat exchange between the secondary coolant and the flow of outside air.

9. A fuel cell powered vehicle comprising;

a fuel cell serving as a power source;

an electric vehicle motor powered by the fuel cell for propelling the vehicle;

a primary circulation passage connected to the fuel cell and including a primary circulation pump for circulating primary coolant in the primary circulation passage to maintain the temperature of the fuel cell at a given temperature;

a first heat exchanger having first and second flow passages, with the first flow passage being located in the primary circulation passage;

a secondary circulation passage connected to a heat generating source composed of at least the electric vehicle motor and including a secondary circulation pump for circulating secondary coolant in the secondary circulation passage, with the secondary circulation passage being located in the second flow passage of the first heat exchanger to achieve heat exchange between the primary coolant and the secondary coolant;

a single pump drive motor including a first rotatable shaft connected to and driving the primary circulation pump and a second rotatable shaft connected to and driving the secondary circulation pump; and a second heat exchanger located in the secondary circulation passage to achieve heat exchange between the secondary coolant and the flow of outside air wherein the secondary circulation passage includes a main circulation flow passage for circulating the secondary coolant through the secondary circulation pump, the first heat exchanger and the second heat exchanger, and a sub-circulation flow passage for circulating the secondary coolant through the secondary circulation pump, the heat generating source and the second heat exchanger.

10. A fuel cell powered vehicle according to claim 9, further comprising a third heat exchanger located in the sub-circulation flow passage to achieve heat exchange between the secondary coolant and the flow of outside air.

11. A fuel cell powered vehicle according to claim 9 further comprising an intercooler for supplying air to the fuel cell and located in the main circulation flow passage of the secondary circulation passage.

12. A fuel cell powered vehicle according to claim 9, further comprising a supercharger for supplying air to the fuel cell, a power drive unit and a drive motor connected to the supercharger, with both the power drive unit and the drive motor of the supercharger being located in the sub-circulation flow passage of the secondary circulation passage and cooled with the secondary coolant.

13. A cooling system for a fuel cell powered vehicle wherein a fuel cell is mounted as a power source of an electric vehicle motor, the cooling system comprising:

a primary circulation passage arranged to allow primary coolant to be circulated through a primary circulation pump to cool the fuel cell;

a secondary circulation passage arranged to circulate secondary coolant through a secondary circulation pump; and a heat exchanger for achieving heat exchange between the primary coolant and the secondary coolant;

wherein the primary circulation pump and the secondary circulation pump are respectively connected to and driven with a single pump drive motor;

wherein the primary circulation pump and the secondary circulation pump are constructed such that flow rates of the primary and secondary circulation pumps are differentiated, wherein the flow rate of the primary circulation pump is determined such that a temperature of the primary coolant flowing through an inlet side of the heat exchanger and a temperature of the primary coolant flowing through an outlet side of the heat exchanger are different to remain in a predetermined temperature difference, and wherein the flow rate of the secondary circulation pump is determined so as to allow a temperature of the primary coolant flowing through the outlet side of the heat exchanger to remain at a predetermined temperature.

* * * * *